A. BOGDÁNFFY.
MACHINE FOR THE MANUFACTURE OF BOTTLE CLOSURES.
APPLICATION FILED JULY 29, 1914.
1,136,398.
Patented Apr. 20, 1915.
4 SHEETS—SHEET 3.
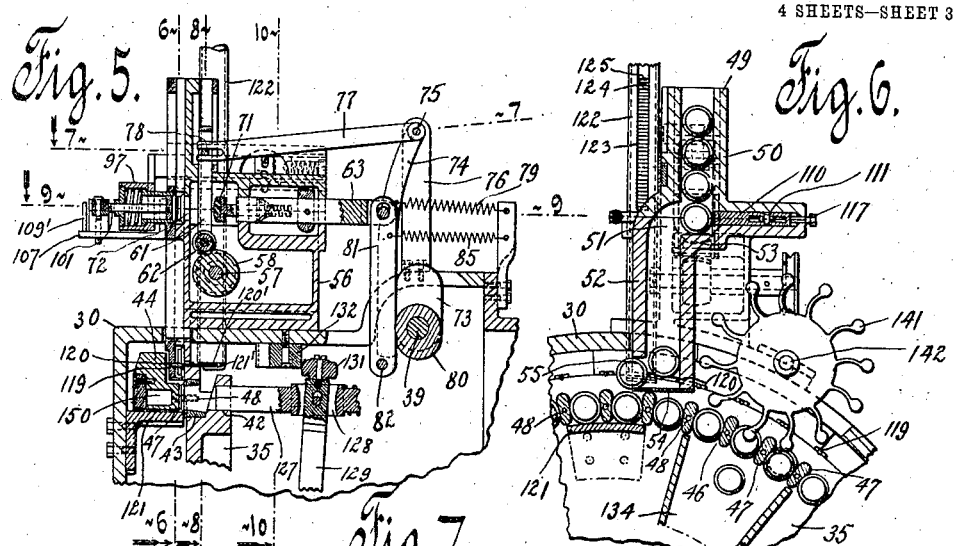
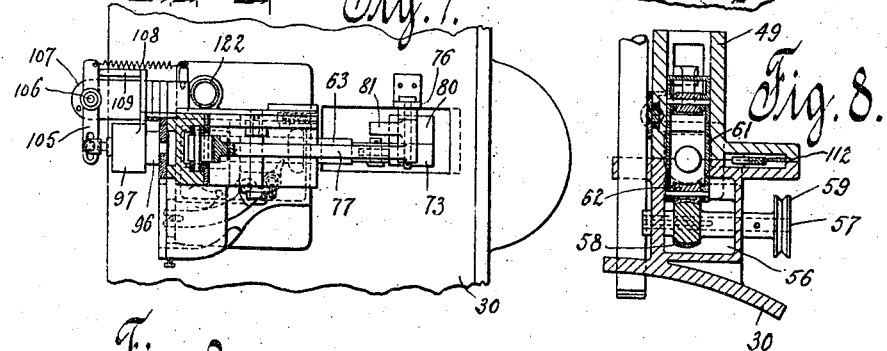
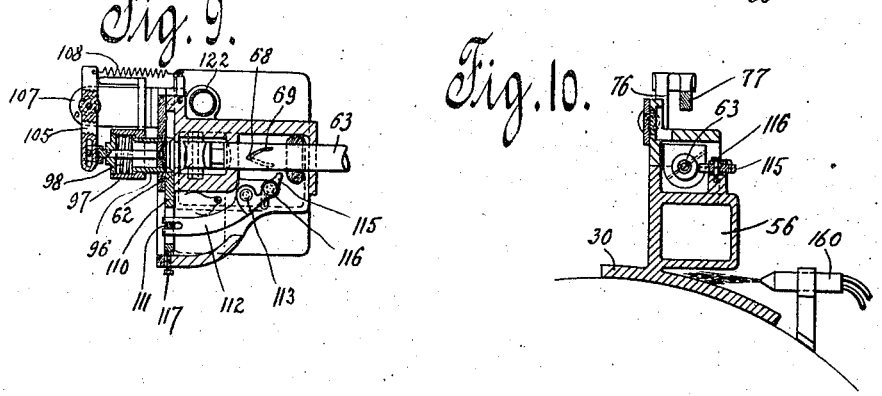
WITNESSES
INVENTOR
A. Bogdánffy
BY
Sigmund Herzog
his ATTORNEY A. BOGDÁNFFY.
MACHINE FOR THE MANUFACTURE OF BOTTLE CLOSURES.
APPLICATION FILED JULY 29, 1914.
1,136,398.
Patented Apr. 20, 1915.
4 SHEETS—SHEET 4.
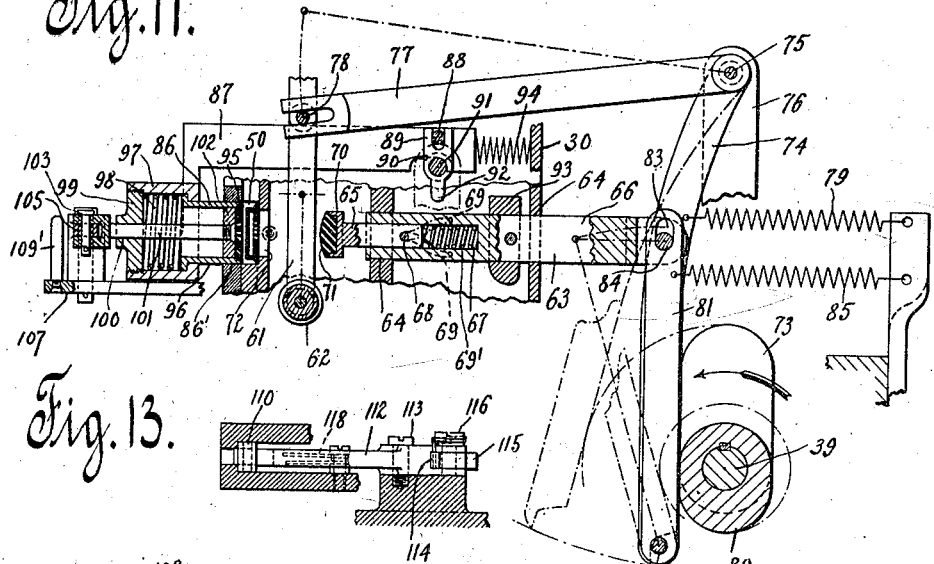
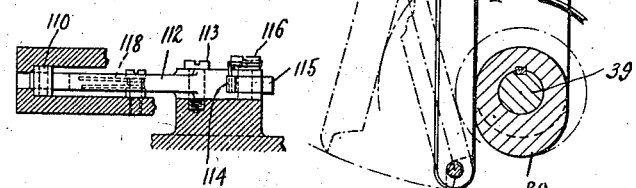
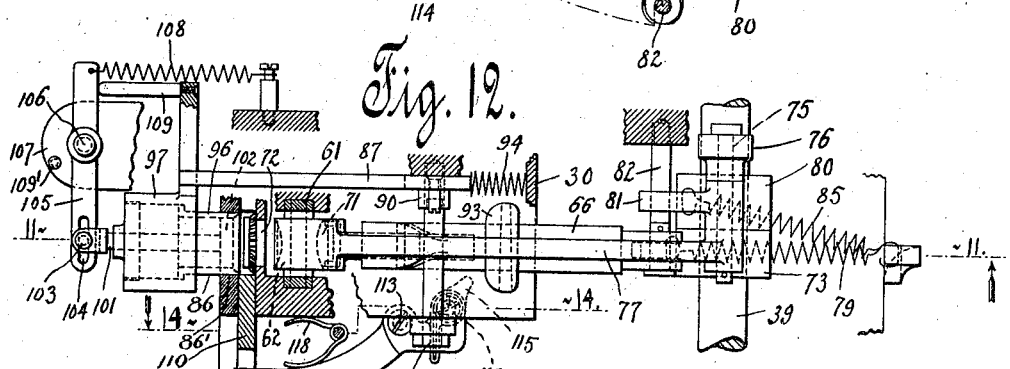
WITNESSES
INVENTOR

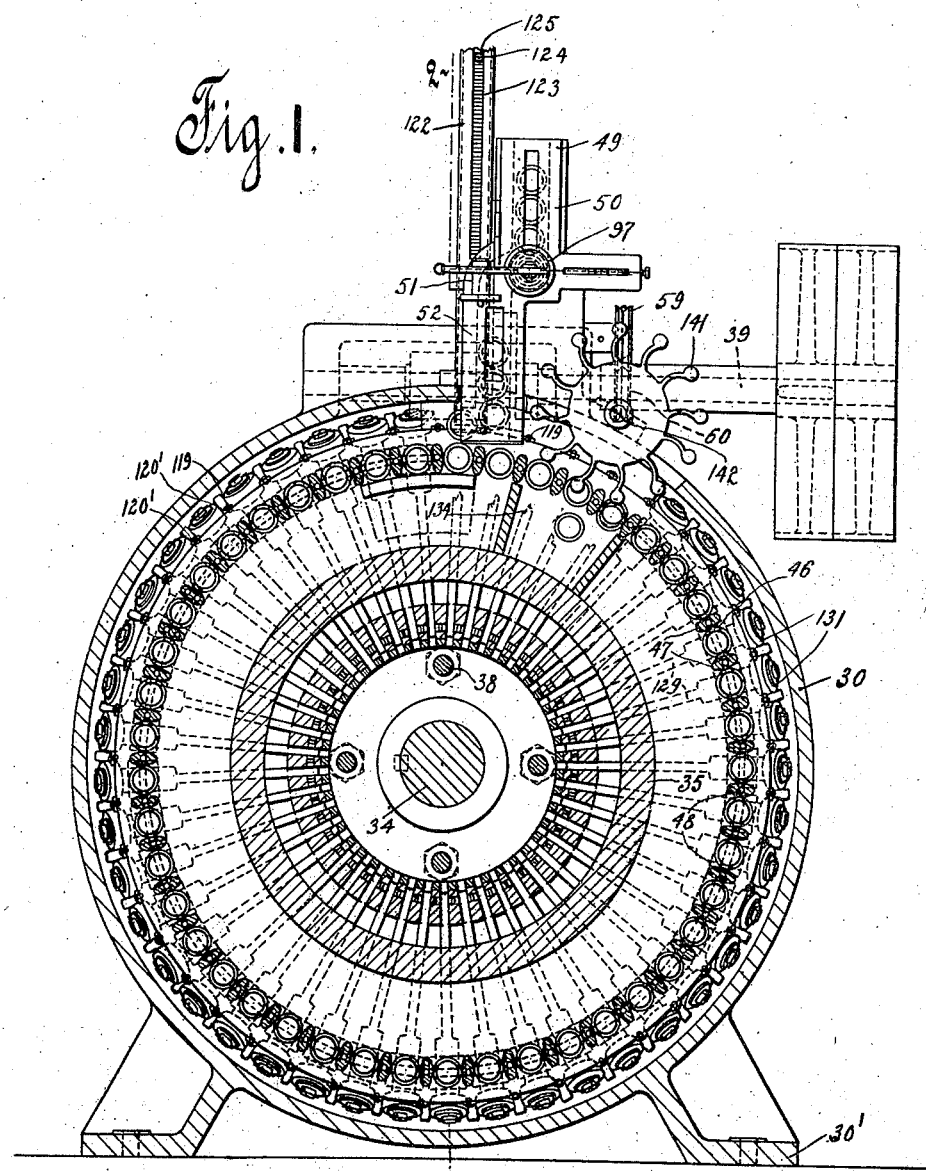

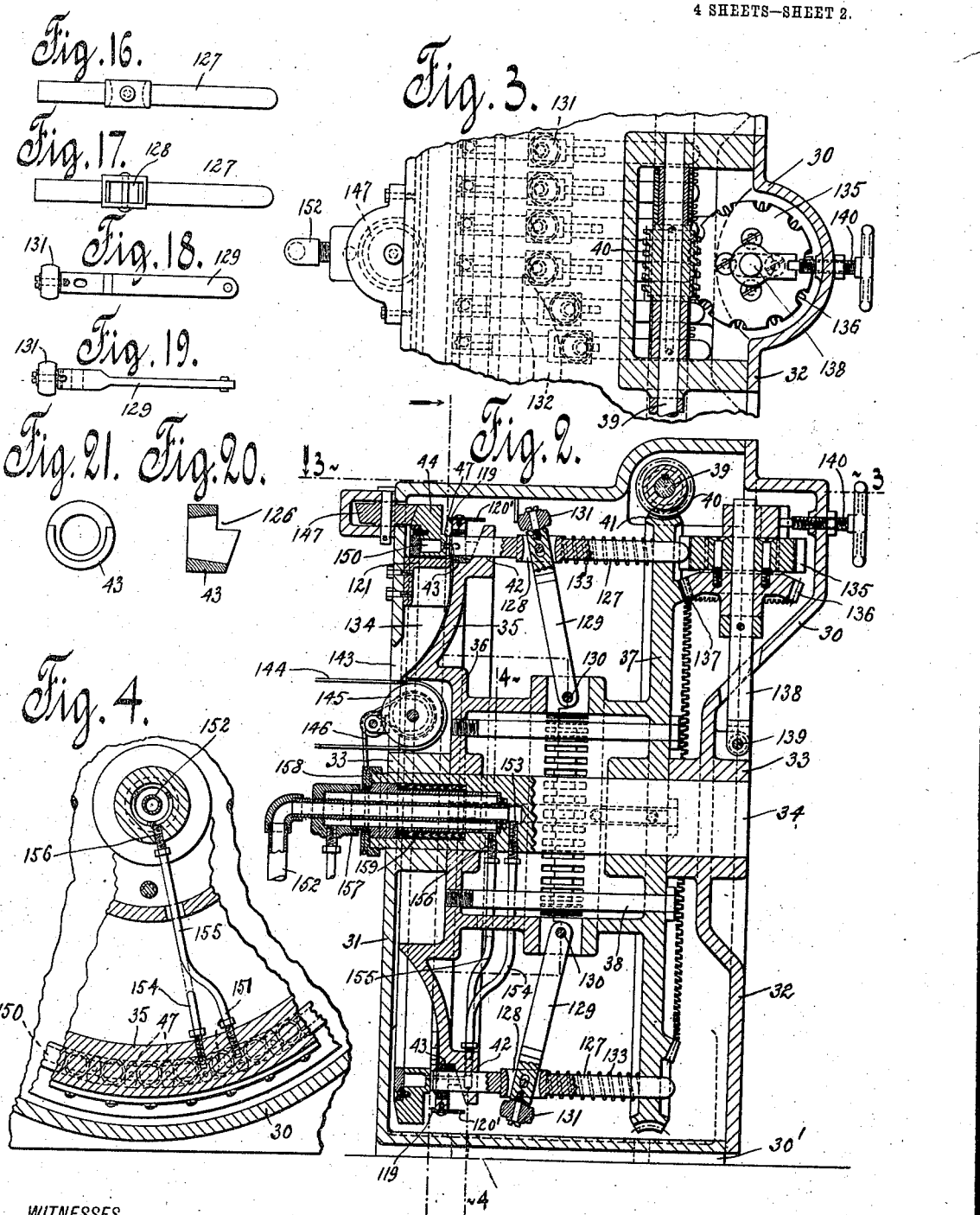

UNITED STATES PATENT OFFICE.

ALEXANDER BOGDÁNFFY, OF NEW YORK, N. Y.

MACHINE FOR THE MANUFACTURE OF BOTTLE-CLOSURES.

1,136,398. Specification of Letters Patent. Patented Apr. 20, 1915.

Application filed July 29, 1914. Serial No. 853,967.

*To all whom it may concern:*

Be it known that I, ALEXANDER BOGDÁNFFY, a subject of the King of Hungary, and a resident of the city of New York, in the county of Kings and State of New York, have invented certain new and useful Improvements in Machines for the Manufacture of Bottle-Closures, of which the following is a specification.

The present invention relates to machines for assembling and uniting closures or stoppers for bottles, cans and like receptacles, and more particularly closures of the cap variety, including those termed "crown corks." Closures of this type comprise usually three elements, that is a metallic cap or crown to be locked to the neck of the bottle, etc., a sealing disk or packing of cork or the like, and a fusible, impervious cementing medium, for instance in the form of a disk, that is interposed between the metallic cap and the sealing disk. In manufacturing these closures, the cementing medium is fused and the assembled closure subjected to pressure before the cementing medium sets or hardens, whereby it unites the sealing disk with the metallic cap. Usually the three parts mentioned are first assembled and the closure, as a whole, then subjected to heating action to fuse the cementing medium, pressure being applied afterward. In other cases the caps contain the cementing medium only when heat is applied to the same, the sealing disks being inserted subsequently. Again, in some cases liquid or viscous cementing media are made use of.

The present invention pertains to a machine for manufacturing closures of the latter type, that is to say to a machine, which uses a liquid or semi-liquid cementing medium in manufacturing the closures. Machines of this type heretofore in use comprise two distinct units, that is an assembling unit and a uniting unit. The first mentioned unit assembles the three parts of the closure, and the second unit serves to keep the closures under pressure while the cementing medium sets and the elements of the closure are being united.

One of the objects of the present invention is to provide a machine of the character specified wherein the assembling and uniting elements are combined in such a manner that they form one integral whole in the form of a head or drum that rotates around a horizontal axis.

Another object of the invention is to so construct and arrange the cap feeding chute that the caps of the closures are fed into the assembling and uniting head by gravity, thereby insuring a reliable and positive feeding thereof.

A further object of the invention is to provide the assembling and uniting head with plungers, and so to arrange the same in relation to the other elements of the machine that said plungers cause the sealing disks to move into their respective caps on top of the cementing medium, holding then the component parts of the closures under pressure while the uniting takes place.

A still further object of the invention is to provide a machine for the manufacture of closures upon which can be used, without any change, cementing media which set without heat or cooling, or also media which are set by the aid of heat or cooling, respectively.

Heretofore, as far as known, the cap feeding chutes were constructed to convey caps either in inverted or upright positions to horizontally rotating transporting disks. For this reason the chutes, which are substantially vertical, had to be provided with arc-shaped discharge ends, and special feeding fingers or other attachments had to be made use of, which delivered one after the other the caps to the horizontally rotating disks. In these arc-shaped ends, as soon as there were only a few caps in the chutes, the caps did not move, there being no pressure above the same.

One of the objects of the present invention is to obviate this defect, and to provide in combination with an assembling and uniting head, which rotates around a horizontal axis, a vertical feeding chute so that the caps move by gravity into the recesses of said head, and without the aid of special feeding fingers or similar devices.

A further object of the invention is to combine the said feeding chute with a cementing material applying mechanism, which provides the inner faces of the caps with cementing material while they are in vertical positions in the said chute, no matter of what character or type the said cementing material be.

A still further object of the invention is to provide a machine for the manufacture of closures for receptacles which is simple in construction, unites the parts of the closures in a quick and reliable manner, renders the sealing or packing disks impervious, and applies measured quantities of cementing or adhesive material to the inner faces of the caps, thereby providing closures in which the liquid is prevented from reaching the metallic parts of the closures when in use upon bottles or other receptacles, and in which the gases with which the liquid may be charged cannot work their way through the packing.

With these and other objects in view, which will more fully appear as the nature of the invention is better understood, the same consists in the combination, arrangement and construction of parts hereinafter fully described, pointed out in the appended claims and illustrated in the accompanying drawings, it being understood that many changes may be made in the size and proportion of the several parts and details of construction within the scope of the appended claims without departing from the spirit or sacrificing any of the advantages of the invention.

One of the many possible embodiments of the invention is illustrated in the accompanying drawings, in which:—

Figure 1 is a vertical section, partly in elevation, taken through a machine constructed in accordance with the present invention; Fig. 2 is a section taken on line 2—2 of Fig. 1; Fig. 3 is a portion of a section taken on line 3—3 of Fig. 2; Fig. 4 is a part of a section taken on line 4—4 of Fig. 2; Fig. 5 is a section taken through the feeding means of the machine; Fig. 6 is a section taken on line 6—6 of Fig. 5; Fig. 7 is a section taken on line 7—7 of Fig. 5; Fig. 8 is a section taken on line 8—8 of Fig. 5; Fig. 9 is a section taken on line 9—9 of Fig. 5; Fig. 10 is a section taken on line 10—10 of Fig. 5; Fig. 11 is a detail of the device shown in Fig. 5 of the drawings on an enlarged scale; Fig. 12 is a plan view, partly in section, of the device shown in Fig. 11; Fig. 13 is a section taken on line 13—13 of Fig. 12; Fig. 14 is a section taken on line 14—14 of Fig. 12; Fig. 15 is a section taken on line 15—15 of Fig. 14; Fig. 16 is a side elevation of one of the assembling and uniting plungers; Fig. 17 is a plan view thereof; Fig. 18 is a side elevation of one of the plunger actuating means; Fig. 19 is a front elevation thereof; Fig. 20 is a section taken through one of the passages in which the packing disks are fed into the metallic caps; and Fig. 21 is a side elevation thereof.

In the drawings, the numeral 30 indicates a cylindrical casing, resting upon a base 30', that may be attached in any suitable manner to the floor or other suitable support. The head 31 of this casing is, preferably, cast integral therewith, its other head 32 being attached to the same by screws, or otherwise. The two heads of the casing are provided with bearings 33, in which is rotatably journaled a horizontal shaft 34, to which is keyed, or otherwise fixedly secured, a substantially drum-shaped member or head 35, that is preferably made of two sections 36 and 37, which are bolted together by screws 38, or otherwise. The drum is continuously driven from a main driving shaft 39, that is journaled in the casing 30 and carries a worm 40, in mesh with a worm gear 41, the latter being preferably made integral with the section 37 of the drum. In the section 36 of the drum is formed, in a circle near the periphery of said section, a plurality of axially disposed holes 42, and in alinement with these holes are carried by the said drum sleeves 43, the bores of which taper toward the head 31 for a purpose hereinafter to be described. To the section 36 of the drum is attached a ring 44. In alinement with each hole 42 there is provided upon this ring a substantially radially disposed recess 46, said recesses being formed between ribs 47 on the ring 44, screws 48, passing through the said ribs into the section 36, serving to attach the said ring to the drum. The recesses 46 in the ring are each of a size to accommodate a metallic cap of a closure.

The metallic parts of the closures are fed by any suitable means into a vertically disposed chute 49 with their open ends facing the head 31 of the casing 30. The chute comprises three distinct sections, towit: a vertical section 50, a sidewardly extending section 51, which merges into a second vertical section 52, all of said sections being disposed in one plane, more particularly in the plane in which the recesses 46 in the ring 44 are located. The section 50 of the chute has a bottom 53, which supports the caps therein. From this bottom the lowermost of the caps is by means hereinafter to be described caused to move through the section 51 into the section 52 of the chute, to rest therein on a platform 54, in the form of a plate, that is attached to the chute. From this platform the cap is moved through the outlet 55 of the chute into one of the recesses 46 in the ring 44.

While the caps are in the section 50 of the chute, a suitable adhesive material is applied to the same, more particularly always to the one resting on the bottom 53 thereof. The adhesive material is held in a container 56, which may be cast integral with the chute and attached to the casing of the machine. In this container is journaled a shaft 57, to which is keyed a feed roller 58, that is partly immersed in the adhesive material in the container. To the shaft 57 is furthermore attached a pulley 59, which is driven by the intermediary of a belt from a pulley 60, the latter being keyed to the main driving shaft of the machine. Into the container extends a vertically disposed sliding bar 61, that is properly guided in its movement and carries at its lower end a roller 62, that contacts intermittently with the feed roller 58, whereby adhesive material is applied to the roller 62. The roller 62, in turn, applies the adhesive material to a plunger 63, that is horizontally arranged in alinement with the lowermost of the caps in the section 50 of the chute. This plunger reciprocates in guides 64, and is made of two sections 65 and 66. The section 66 is the one that coöperates with the guides 64. In the section 66 is provided a longitudinal bore 67, in which is slidably disposed part of the section 65, the connection between the two sections being made by a pin 68, that is carried by the section 65 and engages screw-like slots 69 in the section 66. A spring 69' in the bore 67 tends to force the section 65 to its outermost position. The section 65 is provided with a head 70, to which is attached a soft block 71, for instance of rubber, the outer face of which is convex so as to conform to the inner concave face of the heads of the metallic caps of the closures. The block 71 is adapted to protrude through an aperture 72 in the chute 49 and to enter the lowermost of the metallic caps held within the section 50 thereof.

The adhesive material is applied by the roller 62 to the block 71 by raising the bar 61 while the plunger 63 is in its outer position, shown in Fig. 11 of the drawings. The bar and the roller 62 carried thereby are raised and lowered, for instance by a cam and lever arrangement. The cam, which is denoted by the numeral 73, is keyed to the main driving shaft 39, and bears against the arm 74 of a two-armed lever, that is fulcrumed at 75 to a standard 76, the latter being carried by the casing of the machine. The free end of the arm 77 of said lever is fork-shaped and in engagement with a pin 78, that is secured to the sliding bar 61. When the cam 73 is moved in the direction of the arrow shown in Fig. 11 of the drawings, obviously the roller 62 will be raised, and inasmuch as the block 71 of the plunger is in the path of the said roller, the adhesive material carried thereby will be applied to the said block. A spring 79 serves to bring the two-armed lever back to its normal position. The main shaft 39 carries a second cam, denoted by the numeral 80. This cam coöperates with a lever 81, that is fulcrumed at 82 to some stationary part of the machine, and is provided in its other end with a slot 83, that engages a pin 84, the latter being fastened to the plunger 63. By means of this arrangement, the said plunger is caused to move through the aperture 72 into the chute 49, a spring 85 returning the said plunger and the parts connected therewith to their normal positions. The cams 73 and 80 are staggered 180°, which will permit the plunger 63 to remain at rest while the roller carrying bar 61 moves upward and back to its position of rest. When in its position of rest, the plunger is caused to move toward the chute, and for this reason obviously the bar 61 must be fork-shaped, as clearly shown in Fig. 12 of the drawings, to permit the plunger 63 to move toward the chute while the said bar is at rest.

To prevent rotation of the metallic cap while the adhesive material is applied to the inner face thereof and otherwise to hold it in proper position relative to the plunger 63, a cylindrical body 86 projects through an aperture 86' into the chute in alinement with the aperture 72 therein. This cylindrical body is attached to a bar 87, the latter being slidably arranged in guides and connected by a pin 88 to the fork-shaped end 89 of a lever 90, which is fulcrumed at 91 to some stationary part of the machine and carries a lug 92 in the path of a knob 93, that is attached to the plunger 63. A spring 94 holds the bar 87 in its outermost position. The inner edge of the cylindrical body 86 is provided with notches 95, accommodating the corrugations of the metallic caps of crown corks and thereby preventing the rotation of said caps in relation to the said cylindrical body. This body is made of two sections, the inner section, denoted by the numeral 96, being slidably disposed in the section 97, the latter being fixedly attached to the bar 87. A spring 98 serves to project the section 96 of the cylindrical body. The section 97 is closed by a head 99, in which is provided an opening 100, through which extends a rod 101, that is provided within the section 96 of the cylindrical body with a piston 102. This piston is in its normal position, shown in Figs. 11 and 12 of the drawings, disposed near the notched edge of the cylindrical body. The rod 101 carries a pin 103, that is seated in a slot 104 of a two-armed lever 105, the latter being fulcrumed at 106 to an ear 107, which is carried by the frame of the machine. A spring 108 keeps the lever 105 in contact with a projection 109 upon the bar 87. A stop 109' upon the ear 107 limits the outward motion of the lever 105.

The operation of this adhesive material applying means is as follows: Let us suppose that the parts are in the positions shown in Figs. 11 and 12 of the drawings and that there are caps in the section 50 of the chute 49. The main shaft 39 rotates in the direction of the arrow shown in Fig. 11 of the drawings, whereby, first, the cam 73 causes the arm 74 of the two-armed lever to move during one-quarter of a revolution of the shaft 39 inward into the position shown by the dotted lines in Fig. 11 of the drawings. By this movement the roller 62 applies adhesive material to the block 71 of the plunger 63, and during the second quarter of a revolution of the said shaft, the roller 62 and its bar 61 are moved back into their lower normal positions. The cam 80 causes then the lever 81 during the next quarter of a revolution of the shaft to move into the dotted position shown in Fig. 11 of the drawings. By this operation, the plunger 63 is caused to move toward the lowermost of the caps in the chute, but, before the block 71 reaches the cap, the knob 93 swings by the intermediary of the lug 92 the lever 90 correspondingly, whereby the section 96 of the cylindrical body 86 is caused to move through the aperture 86', engaging the lowermost of the caps in the section 50 of the chute and holding it against rotation. The knob 93 is shaped in such a manner that the bar 87 will be kept stationary during the further inward movement of the plunger 63. As the bar 87 is moved in the manner above described, its projection 109 is disengaged from the lever 105, whereby the spring 108 causes the piston 102 to move outward. As now the plunger 63 moves farther inward, the block 71 contacts with the inner face of the metallic cap, the slots 69 and the pin 68 coöperating therewith causing, as soon as said block contacts with the inner face of the cap, a partial turn of said block, whereby the adhesive material is spread over the entire surface of the head of the cap. During the next quarter of a turn of the shaft 39, the plunger 63 moves back to its normal position, the bar 87 causing by the intermediary of the lever 105 the piston 102 to move inwardly and to remove the cap from the section 96 of the cylindrical body 86.

It should be observed that the connection between the sections 96 and 97 of the cylindrical body 86 is yielding to prevent a crushing or defacing of the caps while they are acted upon by the plunger 63. The piston 102 in the cylindrical body prevents the next cap in the series from tilting as it slides down to the bottom 53 of the section 50 of the chute. If there is no cap held by the cylindrical body 86, the plunger moves into the same, but will not contact with the piston 102.

After the adhesive material has been applied to a cap in the manner now described, the said cap is caused to move into the section 52 of the chute. The means for doing this comprises a conveyer in the form of a reciprocable bar 110, that is slidably arranged in alinement with the lowermost of the caps in the section 50 of the chute, and more particularly horizontally at right angles to the plunger 63. This conveyer is actuated by the knob 93 in the following manner: The bar 110 is provided with a pin 111, that is engaged by the fork-shaped end of a lever 112, the latter being fulcrumed at 113 to some stationary part of the machine, and provided with a shoulder 114, against which is adapted to bear a spring pressed lug 115, that is pivoted at 116 to the lever 112. The lug 115 is disposed in the path of the knob 93. When this knob moves inward toward the chute, it will ride over the lug 115 without affecting the position of the lever 112. A spring returns the lug 115 to its normal position. When the plunger 63 moves back to its normal position, shown in Fig. 11 of the drawings, after the adhesive material has been applied to the cap, the knob 93 swings the lug 115 in the opposite direction, whereby it will cause the conveyer 110 to move inward, thereby transporting the lowermost of the caps in the chute into the section 52 thereof, where it will fall onto the platform 54 above described. A set screw 117 limits the outward movement of the conveyer 110, said outward movement being brought about by a spring 118.

The caps to which adhesive material has been applied in the manner above described are moved one after the other into the recesses 46 in the ring 44. For this purpose, in alinement with each rib 47 there is carried by the drum above the corresponding sleeve 43 a pin 119, which pins project, as the drum is being rotated, through a slot 120 into the chute and engage the caps resting upon the platform 54 thereof. The pins, one after the other, cause the caps to leave the chute through the outlet 55, and to fall by gravity into the recesses ahead of a pin to rest upon an arc-shaped platform 121, that is carried by the head 31 of the casing 30. With each pin 119 is associated a finger 120', that is adapted to pass through a slot 121' above the bottom of a vertical tube 122, which is attached to the casing 30 in any suitable manner, and is provided with a longitudinal slot 123, through which a finger-piece 124 of a weight 125 protrudes, said weight being placed on packing disks of cork or the like and serves to feed the said disks toward the bottom of said tube. This tube is disposed in such relation to the chute 49 that, simultaneously with the feeding of a cap into a recess 46, a packing disk is fed to the corresponding sleeve 43. As shown in Figs. 20 and 21, these sleeves are recessed at 126, so that a packing disk falling onto the drum is tilted and brought into the proper sleeve into substantially vertical position. The packing disk is forced through a sleeve into the metallic cap in registering position therewith by a plunger 127, of which there are as many provided on the drum as there are sleeves 43 thereon. These plungers are slidably arranged in alinement with said sleeves on the drum parallel to the shaft 34, their outer ends projecting beyond the section 37 of said drum. Each plunger is provided with a slot 128, in which is disposed a lever 129, that is pivoted at 130 to the hub of the drum, there being obviously as many levers as there are plungers, said levers being radially arranged upon the drum and carrying at their free ends, which project beyond the plungers, anti-friction rollers 131, which are adapted to coact with a cam 132, fastened to the casing of the machine. Springs 133, coiled around the plungers, serve to force them toward the head 31 of the casing 30. The cam 132 is arranged in the path of the anti-friction rollers 131, whereby, as the drum rotates, the plungers 127 will be forced against the action of the springs 133 out of the recesses in the ring 44, and more particularly before they arrive opposite to a passage 134 upon the head 31. With the plungers 127 coöperates a cam-wheel 135, that is fixedly attached to a bevel gear 136, meshing with a similar gear 137, the latter being formed upon the drum 35. The cam wheel 135 and the bevel gear 136 are rotatably mounted upon a spindle 138, that is pivoted at 139 upon the head 32 of the casing 30, the distance between the spindle and the section 37 of the drum being adjustable, for a purpose hereinafter to be described, by a set screw 140.

In the rotation of the drum, the cam 132 causes a plunger 127 to move out of the corresponding sleeve 43 before the said sleeve arrives in operative relation to the tube 122 and obviously before the corresponding recess in the ring 44 is brought into operative relation to the chute 49. Both the cam and the platform 121 are of such lengths that ample time is given to the metallic caps and the packing disks to occupy their proper positions relative to a plunger 127. The caps slide along the arc-shaped platform until the corresponding plunger 127 is disengaged from the cam, when the corresponding spring 133 causes the said plunger to move toward the cap, thereby forcing the sealing disk in registering position therewith into the same. After this has been accomplished, the plunger comes within the reach of the cam wheel 135, which will cause a proper seating of the packing disk in the cap, which could not be done by the springs 133 alone if one or the other one of said disks is not as pliable or soft as usual. The disks are thus compressed to some extent, depending upon the position of the spindle 138 relative to the ring 44. The assembled closures are thus placed under compression and are held in this condition until they very nearly make a full revolution around the shaft 34, when the roller 131 of a plunger again arrives at the cam 132, which disengages the plunger from the closure and allows the same to drop into the passage 134. To insure a disengagement of the finished closures from the recesses in the ring 44, a star wheel 141 is pivoted at 142 to the frame of the machine, and is rotated by the ribs 47 above described. The arms of this star wheel cause the closures to be disengaged in all events from the recesses in the drum by reason of their arms projecting into the said recesses.

In alinement with the passage 134 there is provided an opening 143 in the head 31 of the drum, through which the finished product is adapted to fall into a receptacle or onto a belt conveyer 144, the roller 145 of which may be driven by a belt 146 from the shaft 34 of the drum 35. To counteract the pressure exerted by the cam wheel 135 upon the plungers 127, a conical roller 147 is mounted upon the head 31 of the casing. This roller bears against the ring 44 and will relieve the drum from undue pressure.

The smaller diameter of the tapered bore of a sleeve 43 is smaller than that of a sealing disk. The latter will thus be compressed to some extent as it is forced through the sleeve. When in the cap, it expands and is thus fixedly held in the cap.

The machine so far described is adapted for use with an adhesive material or cementing medium that is applied in its cold state to the closures. If a cementing medium is used which must be heated before it can be applied to the closures and where the closures must be cooled while they are held under compression, the ring 44 is provided with an annular channel 150, said channel being provided with a radially extending partition 151, the cooling fluid, for instance cold water, being admitted into the channel on one side of its partition, travels around said channel and leaves the same on the other side of the partition. The fluid flows to the channel through a pipe 152, communicating with a bore 153 in the shaft 34, that is connected by a pipe 154 with the channel on one side of the partition 151. The other side of the partition is connected by a pipe 155 with a bore 156 in the shaft 34, said bore being connected with a pipe 157. A stuffing box 158 and a packing material 159 prevent a leakage of the fluid in the direction of the longitudinal axis of the shaft 34. The fluid, admitted through the pipe 152, and the passages communicating therewith into the channel 150, goes through the same and leaves it through the pipe 157, effectively cooling the closures while they are held under compression and thus causing the cementing material to set. For the purpose of heating the cementing material in the container 56, a gas burner 160 is located below the said container.

If a cementing material is used which is coagulated by heat, there is admitted into the channel 150 a heating fluid, for instance steam, which leaves the said channel through the pipe 157. The temperature of the fluid is maintained at a point sufficient to coagulate the cementing medium within the assembled closures while they are held under compression. The coagulation results in a firm union between the parts of the closures.

From the foregoing it appears that the machine is adapted for use in connection with three different kinds of cementing materials without necessitating any changes in the construction of the machine.

It is to be observed that the plungers 127 assemble the parts of the closures, and that they serve at the same time to unite the parts thereof, that is to say to hold them under compression while the cementing medium sets. The drum 35 constitutes the assembling and uniting element of the machine, and, inasmuch as the same rotates around a horizontal axis, a positive feeding of the parts of the closure is obtained, the said parts being inserted by means carried by the said drum and by gravity. The parts of the closures, not being put under compression immediately upon entering the drum, obviously are permitted to occupy their proper positions thereon, whereby the production of faulty closures is prevented.

The other objects and advantages of the machine are apparent from the foregoing.

What I claim is:—

1. In a machine for the manufacture of bottle closures of the cap variety, the combination with a rotary drum having a plurality of recesses, of a chute for holding the metallic parts of the closures, means for holding a plurality of sealing disks to be deposited into said metallic parts, and means carried by said drum for feeding the metallic parts into said recesses and the disks into said metallic parts while in said recesses.

2. In a machine for the manufacture of bottle closures of the cap variety, the combination with a rotary drum having a plurality of recesses, of a chute for holding the metallic parts of the closures, means for holding a plurality of sealing disks to be deposited into said metallic parts, means carried by said drum for feeding the metallic parts into said recesses and the disks into said metallic parts while in said recesses, and means for applying a cementing medium to the inner faces of said metallic parts while in said chute.

3. In a machine for the manufacture of bottle closures of the cap variety, the combination with a rotary drum having a plurality of recesses, of a chute for holding the metallic parts of the closures, means for holding a plurality of sealing disks to be deposited into said metallic parts, means carried by said drum for feeding the metallic parts into said recesses and the sealing disks onto said drum, and a plurality of spring pressed plungers on said drum for assembling the said metallic parts and sealing disks.

4. In a machine for the manufacture of bottle closures of the cap variety, the combination with a rotary drum having a plurality of recesses, of a chute for holding the metallic parts of the closures, means for applying a cementing medium to said metallic parts while in said chute, means for holding a plurality of sealing disks to be deposited into said metallic parts, means carried by said drum for feeding the metallic parts into said recesses and the sealing disks onto said drum, and a plurality of spring pressed plungers on said drum for assembling the elements of the closures and for holding them under compression for nearly one complete revolution of said drum.

5. In a machine for the manufacture of bottle closures of the cap variety, the combination with a rotary drum having a plurality of recesses, of means for feeding the metallic parts of the closures and the sealing disks into the said recesses, a plurality of spring pressed plungers for placing the same under compression, and means independent of the springs for causing the sealing disks to be compressed to a predetermined thickness.

6. In a machine for the manufacture of bottle closures of the cap variety, the combination with a rotary drum having a plurality of recesses, of means for feeding the metallic parts of the closures and the sealing disks into the said recesses, a plurality of spring pressed plungers for placing the same under compression, and means actuated by said drum independent of the springs for causing the sealing disks to be compressed to a predetermined thickness.

7. In a machine for the manufacture of bottle closures of the cap variety, the combination with a rotary drum having a plurality of recesses, of means for feeding the metallic parts of the closures and the sealing disks into the said recesses, a plurality of spring pressed plungers for placing the same under compression, and a cam-wheel coöperating with said plungers for causing the sealing disks to be compressed to a predetermined thickness.

8. In a machine for the manufacture of bottle closures of the cap variety, the combination with a rotary drum having a plurality of recesses, of means for feeding the metallic parts of the closures and the sealing disks into the said recesses, a plurality of spring pressed plungers for placing the same under compression, and a cam-wheel actuated by said drum coöperating with said plungers for causing the sealing disks to be compressed to a predetermined thickness.

9. In a machine for the manufacture of bottle closures of the cap variety, the combination with a rotary drum having a plurality of recesses and apertures in alinement therewith, of a chute for holding the metallic parts of the closures having a slot, a tube for holding a plurality of sealing disks to be deposited into said metallic parts having a slot near its bottom, and pins carried by said drum passing through the slots in said chute and said tube, whereby the metallic parts of the closures are fed into said recesses and the sealing disks into said apertures.

10. In a machine for the manufacture of bottle closures of the cap variety, the combination with a rotary drum having a plurality of recesses and apertures in alinement therewith, of a chute for holding the metallic parts of the closures having a slot, a tube for holding a plurality of sealing disks to be deposited into said metallic parts having a slot near its bottom, pins carried by said drum passing through the slots in said chute and said tube, whereby the metallic parts of the closures are fed into said recesses and the sealing disks into said apertures, and spring pressed plungers for forcing the sealing disks through said apertures into said metallic parts.

11. In a machine for the manufacture of bottle closures of the cap variety, the combination with a rotary drum having a plurality of recesses and apertures in alinement therewith, of a chute for holding the metallic parts of the closures having a slot, a tube for holding a plurality of sealing disks to be deposited into said metallic parts having a slot near its bottom, pins carried by said drum passing through the slots in said chute and said tube, whereby the metallic parts of the closures are fed into said recesses and the sealing disks into said apertures, and spring pressed plungers for forcing the sealing disks through said apertures into said metallic parts and for holding the said parts under compression while said drum makes very nearly a complete revolution.

12. In a machine for the manufacture of bottle closures of the cap variety, the combination with a rotary drum having a plurality of recesses and apertures in alinement therewith, of a chute for holding the metallic parts of the closures having a slot, a tube for holding a plurality of sealing disks to be deposited into said metallic parts having a slot near its bottom, pins carried by said drum passing through the slots in said chute and said tube, whereby the metallic parts of the closures are fed into said recesses and the sealing disks into said apertures, and means for applying a cementing material to the inner faces of said metallic parts while in said chute.

13. In a machine for the manufacture of bottle closures of the cap variety, the combination with a rotary drum having a plurality of recesses and apertures in alinement therewith, of a chute for holding the metallic caps of the closures having a slot, a tube for holding a plurality of sealing disks to be deposited into said metallic parts having a slot near its bottom, pins carried by said drum passing through the slots in said chute and said tube, whereby the metallic parts of the closures are fed into said recesses and the sealing disks into said apertures, spring pressed plungers for forcing the sealing disks through said apertures into said metallic parts, and means for applying a cementing material to the inner faces of said metallic parts while in said chute.

14. In a machine for the manufacture of bottle closures of the cap variety, the combination with a rotary drum having a plurality of recesses and apertures in alinement therewith, of a chute for holding the metallic parts of the closures having a slot, a tube for holding a plurality of sealing disks to be deposited into said metallic parts having a slot near its bottom, pins carried by said drum passing through the slots in said chute and said tube, whereby the metallic parts of the closures are fed into said recesses and the sealing disks into said apertures, spring pressed plungers for forcing the sealing disks through said apertures into said metallic parts and for holding the said parts under compression while said drum makes very nearly a complete revolution, and means for applying a cementing material to the inner faces of said metallic parts while in said chute.

15. In a machine for the manufacture of bottle closures of the cap variety, the combination with a rotary drum having a plurality of recesses and apertures in alinement therewith, of a chute for holding the metallic parts of the closures having a slot, a tube for holding a plurality of sealing disks to be deposited into said metallic parts having a slot near its bottom, pins carried by said drum passing through the slots in said chute and said tube, whereby the metallic parts of the closures are fed into said recesses and the sealing disks into said apertures, spring pressed plungers for forcing the sealing disks through said apertures into said metallic parts, and means independent of the springs for causing the sealing disks to be compressed to a predetermined thickness.

16. In a machine for the manufacture of bottle closures of the cap variety, the combination with a rotary drum having a plurality of recesses and apertures in alinement therewith, of a chute for holding the metallic parts of the closures having a slot, a tube for holding a plurality of sealing disks to be deposited into said metallic parts having a slot near its bottom, pins carried by said drum passing through the slots in said chute and said tube, whereby the metallic parts of the closures are fed into said recesses and the sealing disks into said apertures, spring pressed plungers for forcing the sealing disks through said apertures into said metallic parts, and means actuated by said drum independent of the springs for causing the sealing disks to be compressed to a predetermined thickness.

17. In a machine for the manufacture of bottle closures of the cap variety, the combination with a rotary drum having a plurality of recesses and apertures in alinement therewith, of a chute for holding the metallic parts of the closures having a slot, a tube for holding a plurality of sealing disks to be deposited into said metallic parts having a slot near its bottom, pins carried by said drum passing through the slots in said chute and said tube, whereby the metallic parts of the closures are fed into said recesses and the sealing disks into said apertures, spring pressed plungers for forcing the sealing disks through said apertures into said metallic parts, and a cam-wheel coöperating with said plungers for causing the sealing disks to be compressed to a predetermined thickness.

18. In a machine for the manufacture of bottle closures of the cap variety, the combination with a rotary drum having a plurality of recesses and apertures in alinement therewith, of a chute for holding the metallic parts of the closures having a slot, a tube for holding a plurality of sealing disks to be deposited into said metallic parts having a slot near its bottom, pins carried by said drum passing through the slots in said chute and said tube, whereby the metallic parts of the closures are fed into said recesses and the sealing disks into said apertures, spring pressed plungers for forcing the sealing disks through said apertures into said metallic parts, and a cam-wheel actuated by said drum coöperating with said plungers for causing the sealing disks to be compressed to a predetermined thickness.

19. In a machine for the manufacture of bottle closures of the cap variety, the combination with a vertical chute comprising two parallel sections and one intermediate substantially horizontal section, of a reciprocable plunger in alinement with the lowermost cap in the first one of said sections, means for applying cementing medium to said plunger, means for reciprocating said plunger to bring it into contact with said cap, and means for holding said cap in position as said plunger is moved forward.

20. In a machine for the manufacture of bottle closures of the cap variety, the combination with a vertical chute comprising two parallel sections and an intermediate substantially horizontal section, of a reciprocable plunger in alinement with the lowermost cap in the first one of said sections, means for applying cementing medium to said plunger, means for reciprocating said plunger to bring it into contact with said cap, means for holding said cap in position as said plunger is moved forward, and means for giving said plunger a partial turn while in contact with said cap.

21. In a machine for the manufacture of bottle closures of the cap variety, the combination with a vertical chute comprising two parallel sections and an intermediate substantially horizontal section, of a reciprocable plunger in alinement with the lowermost cap in the first one of said sections, means for applying cementing medium to said plunger, means for reciprocating said plunger to bring it into contact with said cap, means for holding said cap in position as said plunger is moved forward, and means for causing the cap to move after the cementing medium has been applied thereto from the first section of said chute through its substantially horizontal portion into the last section thereof.

22. In a machine for the manufacture of bottle closures of the cap variety, the combination with a vertical chute comprising two parallel sections and an intermediate substantially horizontal section, of a reciprocable plunger in alinement with the lowermost cap in the first one of said sections, means for applying cementing medium to said plunger, means for reciprocating said plunger to bring it into contact with said cap, means for holding said cap in position as said plunger is moved forward, and means actuated by said plunger for causing the cap to move after the cementing medium has been applied thereto from the first section of said chute through its substantially horizontal portion into the last section thereof.

23. In a machine for the manufacture of bottle closures of the cap variety, the combination with a vertical chute comprising two parallel sections and an intermediate substantially horizontal section, of a reciprocable plunger in alinement with the lowermost cap in the first one of said sections, means for applying cementing medium to said plunger, means for reciprocating said plunger to bring it into contact with said cap, and means actuated by said plunger for holding said cap in position as said plunger is moved forward.

24. In a machine for the manufacture of bottle closures of the cap variety, the combination with a reciprocable plunger, of a container adapted to hold a cementing medium, a feeding roller rotated within the cementing medium, a sliding bar, a roller upon said sliding bar adapted to contact with said feeding roller, and means for reciprocating said sliding bar, whereby the cementing medium from its roller is transferred to said plunger.

25. In a machine for the manufacture of bottle closures of the cap variety, the combination with a rotary drum provided with substantially radially arranged ribs, whereby a plurality of recesses is formed, of means for holding an assembled closure in each of said recesses, and means actuated by said ribs for ejecting the closures from said recesses when released by said holding means.

26. In a machine for the manufacture of bottle closures of the cap variety, the combination with a rotary drum having a plurality of recesses, of means for holding in said recesses assembled closures, and means actuated by said drum for ejecting the closures from said recesses when released by said holding means.

27. In a machine for the manufacture of bottle closures of the cap variety, the combination with a chute for holding the caps of the closures having two apertures in opposite walls thereof in alinement with the lowermost of the caps therein, of a cylindrical member adapted to project through one of said apertures to hold the lowermost cap in position within said chute, a piston in said cylindrical member normally near its innermost edge, a plunger adapted to project through the other one of said apertures into said chute for applying adhesive material to the inner face of the lowermost of said caps, and means for withdrawing said piston when said plunger moves toward the last mentioned cap, said means serving at the same time to remove by said piston the lowermost of the caps from said cylindrical member as said plunger is being withdrawn from said chute.

Signed at New York, in the county of New York and State of New York, this 18th day of July, A. D. 1914.

ALEXANDER BOGDÁNFFY.

Witnesses:
SIGMUND HERZOG,
THERESA HERZOG.